United States Patent [19]
Manner et al.

[11] Patent Number: 4,853,190
[45] Date of Patent: Aug. 1, 1989

[54] PROCESS & APPARATUS FOR THE PRODUCTION OF HYDROGEN CYANIDE

[75] Inventors: Reinhard Manner, Maintal; Hans Schaefer, Hanau; Carl Voight, Rodenbach; Wolf D. Pfeifer, Bruhl, all of Fed. Rep. of Germany

[73] Assignee: Degussa AG, Frankfurt, Fed. Rep. of Germany

[21] Appl. No.: 196,799

[22] Filed: May 16, 1988

Related U.S. Application Data

[60] Continuation of Ser. No. 807,178, Dec. 10, 1985, abandoned, which is a division of Ser. No. 589,217, Mar. 13, 1984, Pat. No. 4,594,234.

[30] Foreign Application Priority Data

Mar. 16, 1983 [DE] Fed. Rep. of Germany ....... 3309394

[51] Int. Cl.[4] ............................................. B01J 10/00
[52] U.S. Cl. ..................................... 422/197; 422/204; 423/375; 423/376
[58] Field of Search ................ 422/197, 204; 423/375, 423/376

[56] References Cited

U.S. PATENT DOCUMENTS 2,987,382  6/1961  Endter et al. .................. 422/204 X
4,594,234  6/1986  Manner et al. ....................... 423/376

Primary Examiner—Barry S. Richman
Assistant Examiner—Lynn M. Kummert
Attorney, Agent, or Firm—Cushman, Darby & Cushman

[57] ABSTRACT

There is obtained an increase in the throughput in the known BMA furnace or a BMA furnace chamber without changing the construction and dimensions already present by changing the lower part of the cooling head into a short tubular heat exchanger while maintaining the necessary temperature profile for the process by arranging the ceramic tubes in the furnace chamber in closer or less close fashion and/or by using ceramic tubes having different inner and outer geometries and/or structure.

2 Claims, 11 Drawing Sheets

Fig. 14.
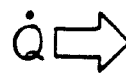
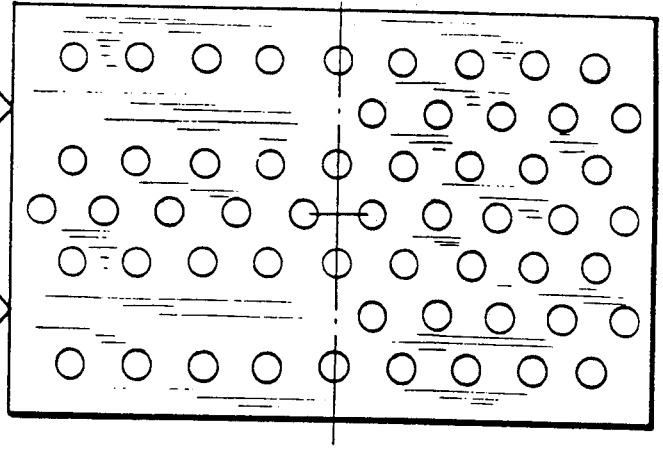
Fig. 15.
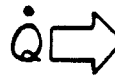
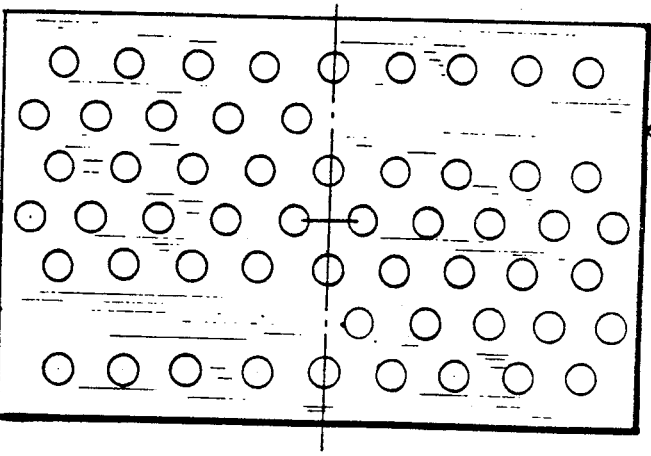
Fig. 16.
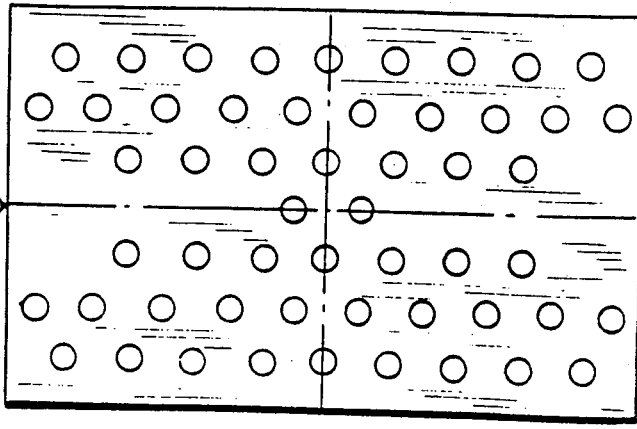

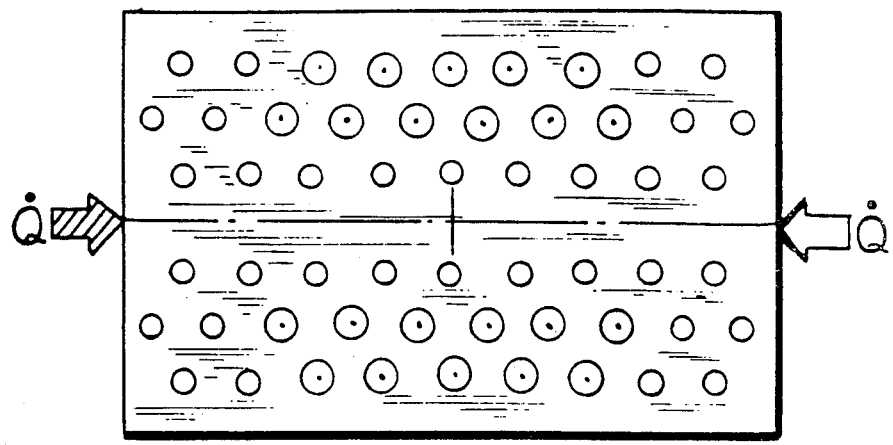
Fig. 22.
Fig. 23.
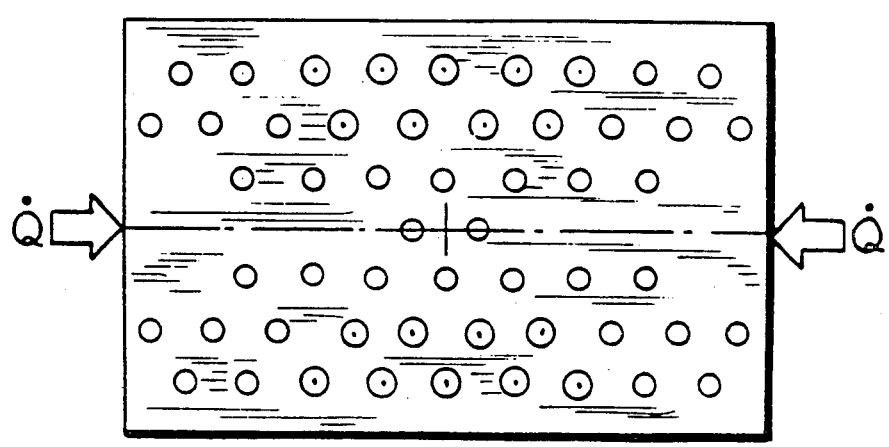

PROCESS & APPARATUS FOR THE PRODUCTION OF HYDROGEN CYANIDE

This is a continuation of application Ser. No. 807,178 filed Dec. 10, 1985, abandoned, which is a division of Ser. No. 589,217 filed Mar. 13, 1984, now U.S. Pat. No. 4,594,234.

BACKGROUND OF THE INVENTION

It is known to produce hydrogen cyanide according to the BMA process (hydrocyanic acid-methane-ammonia process) from an air-free gas mixture which consists of ammonia and a hydrocarbon.

As the hydrocarbon for a long time, there was preferably employed methane; more recently, however, there have also been used successfully so-called liquid gases, e.g., propane, n-butane, or isobutane, see Ullmann, Enzyklopädie der technischen Chemie, 4th edition, Vol. 9, page 359, and German Pat. No. 2913925 and related Voigt U.S. Pat. No. 4,289,741. (The entire disclosure of Voigt is hereby incorporated by reference and relied upon).

In both cases (Ullmann and the German patent or Voigt), the gaseous mixture is led through suspended reaction tubes made of sintered aluminum oxide, which tubes are coated internally with platinum. The tubes hang in bundles in furnace chambers and the hydrogen cyanide containing product gas mixture after passing through the tubes is quickly cooled to below 300° C. in a water cooled chamber at the end of the top of the furnace, see Ullmann, loc. cit.

It is not simple to handle the reaction tubes because of the rapid temperature changes to which the tubes are exposed.

In order to be able to utilize ceramic tubes at high temperatures within industrially interesting times, there must be considered several viewpoints.

In heating to about 1250° C., first there occurs a considerable increase in length. With 2000 mm long tubes of sintered alumina, this is about 15 mm. This means that the tubes, as they are arranged, can only be fastened at one end while the other end must remain freely moveable. Furthermore, above temperatures of 800° to 900° C., the tubes already become plastic, i.e., they remain deformed under the effect of forces acting on them. From this, it follows that the tubes are suitably suspended on one end and allowed to hang freely The connection of the lower ends of the tubes is carried out via a soft, flexible connection which does not put up any mentionable resistance to the movement of the tubes. The gaseous mixture of ammonia and hydrocarbon enters the lower end of the tube at room temperature.

After the gases in the tube are heated to reaction temperature and have reacted on the catalyst, thermodynamic considerations require that they leave the reaction space coated with catalyst as closely as possible to the reaction temperature and be very quickly cooled in a catalyst-free condenser to a temperature below 300° C. Only in this manner is there avoided a reversal of the reaction. Purely from the chemism of the process, these requirements include that the ceramic tube must be held hot effectively to its end The problem was solved by fastening the tube in a short piece of thermal insulation made of asbestos or similar material in a stuffing box and indirectly connecting the subsequent condenser to this stuffing box. Thus, there are simultaneously the demands to be considered to the fullest extent with respect to a marked increase in temperature and that of the ceramic with respect to a hot tube end, see F. Endter, Dechema Monographie, 1959, Vol. 33, pages 28-46.

The aforementioned considerations led to the construction of a furnace top according to FIG. 1. Suitably, the tubes 3 are placed in a free hanging position in the furnace space 2. The furnace top 1 having the under part 4 and the middle part 5 was located above them. The cooled gases were collected in the gas collection space 6. One of the tubes, number 3a, is shown in longitudinal section in order to show its fastening in the tube head holder 7.

The tubes can be sealed off against the gas collection space by a hollow shaft 8 which is shown by the number 8 for the tube 3a. The latter is absolutely important, if for example, a tube is no longer impervious in order that infiltrating fuel gases do not get into the collection space in this manner and impair the product. Furthermore, by means of the covered socket 9, there is the possibility of cleaning the tube after its withdrawal.

First, a furnace top was constructed for thirteen tubes. The tubes were cooled by using cooling coils in which there flowed cooling water.

Subsequently, efforts were made to increase the number of tubes while maintaining the old furnace construction. However, thereby one was constrained by the capacity criteria of the furnace top. Included in these were the thermodynamically favorable temperature profile, the exact mounting of the individual tubes, the good accessibility of the tubes, e.g., in sooting, as well as the simple and safe sealing of the individual tubes against the reaction space. A corresponding construction is described in German Pat. No. 1041476 (and related Endter U.S. Pat. No. 2,987,382, the entire disclosure of which is hereby incorporated and relied upon), which also in FIG. 1, under numbers 12 and 13, in plan view of each shows a furnace chamber terminating furnace top containing thirteen tubes in each case.

By increasing the number of tubes to twenty-six tubes per furnace chamber unit, the throughput had finally reached the geometrical limit of the tube arrangement in the furnace top, which was limiting due to capacity criteria and which, therefore, cannot be changed as desired. Otherwise, there must be enlarged the outer furnace geometry or there must be newly constructed the furnace chambers of the entire furnace and therewith there must be made allowance for considerable new investment.

Until now, it has not been possible to increase the number of tubes beyond twenty-six. In the attempts to increase the number of tubes beyond this number, there no longer is present sufficient room. Thus, the art was satisfied with the throughput obtained thereby which also appears to be the optimum for the stated temperature profile.

The temperature profile being considered is characterized by a quick increase in temperature to 1200° to 1300° C. after introduction of the reactants into the reaction tube and when this temperature is reached constant temperature over the entire length of the reaction tube until the gaseous mixture enters the cooling head. Here there takes place a sharp drop to below 300° C. In order to protect the ceramic tube, as stated above, there is employed a corresponding insulation. The stipulation to the mentioned twenty-six tubes, however, was extremely unsatisfactory.

Therefore, it was the problem of the invention to increase the space-time-yield in the furnace available without changing the stated temperature profile inside the tube and in the cooling head and moreover that at the same time the possibilities simultaneously exist of shutting off damaged or clogged tubes from the gas collection space or to clean them easily.

BRIEF DESCRIPTION OF THE DRAWINGS

FIGS. 8, 9, and 10 show various burner operations; and

SUMMARY OF THE INVENTION

It has now been found that the throughput of a furnace or a furnace chamber and correspondingly the space-time-yield of a furnace in the BMA process can be substantially increased while maintaining the known furnace or furnace chamber construction and dimension and the necessary temperature profile if there is constructed the lower part of the cooling top (or head) as a short tubular bundle heat exchanger with substantially unchanged outer geometry of the cooling top and by maintaining the course of the reaction and cooling temperature, corresponding to the temperature profile through combining the number and arrangement of the reaction tubes with the number and arrangement of the heating elements in the furnace chamber, whereby there is preferably selected in the flame rich zones, a less dense arrangement of the tubes, and conversely the number of tubes is increased.

A preferred form of carrying out the processes uses a single or multi chamber tube furnace for continuously carrying out the hydrocyanic acid-methane-ammonia (BMA) process as set forth in the method claims at temperatures above 1000° C. in ceramic tubes which hang free in the furnace chamber or chambers, which are connected with a common gas supply and gas withdrawal apparatus, in which the chamber or chambers are heated by one or more burners and the gas withdrawal is carried out in a cooling top constructed as a cooling agency, in which the ceramic tubes are hung in gas tight manner, which process is characterized by constructing the cooling top (known as of itself) in its lower part as a short tubular bundle exchanger through which there flows a cooling liquid, the height of the cooling head corresponding to the cylindrical part of the stuffing boxes in which the ceramic tubes are embedded using a flexible, heat resistant material, whereby these stuffing boxes have a contact with the heat exchangers such at there is attained a reduction in temperature within the through-flowing product gases of 200°–300° C. in the lower part of the cooling top and that the warmer or colder zones formed through the heating of the furnace chamber maintain the necessary temperature profile for retaining the previously customary throughput of the reaction gases for each individual ceramic tube by a denser or less dense (i.e., closer or further apart) arrangement of the ceramic tubes in the furnace chamber and/or through ceramic tubes having different inner and outer geometry and/or structure The withdrawal of heat in the furnace top, i.e., in the lower part as in the middle part is carried out with customary industrial cooling media as, e.g., with water or salt solutions.

Figure 1:
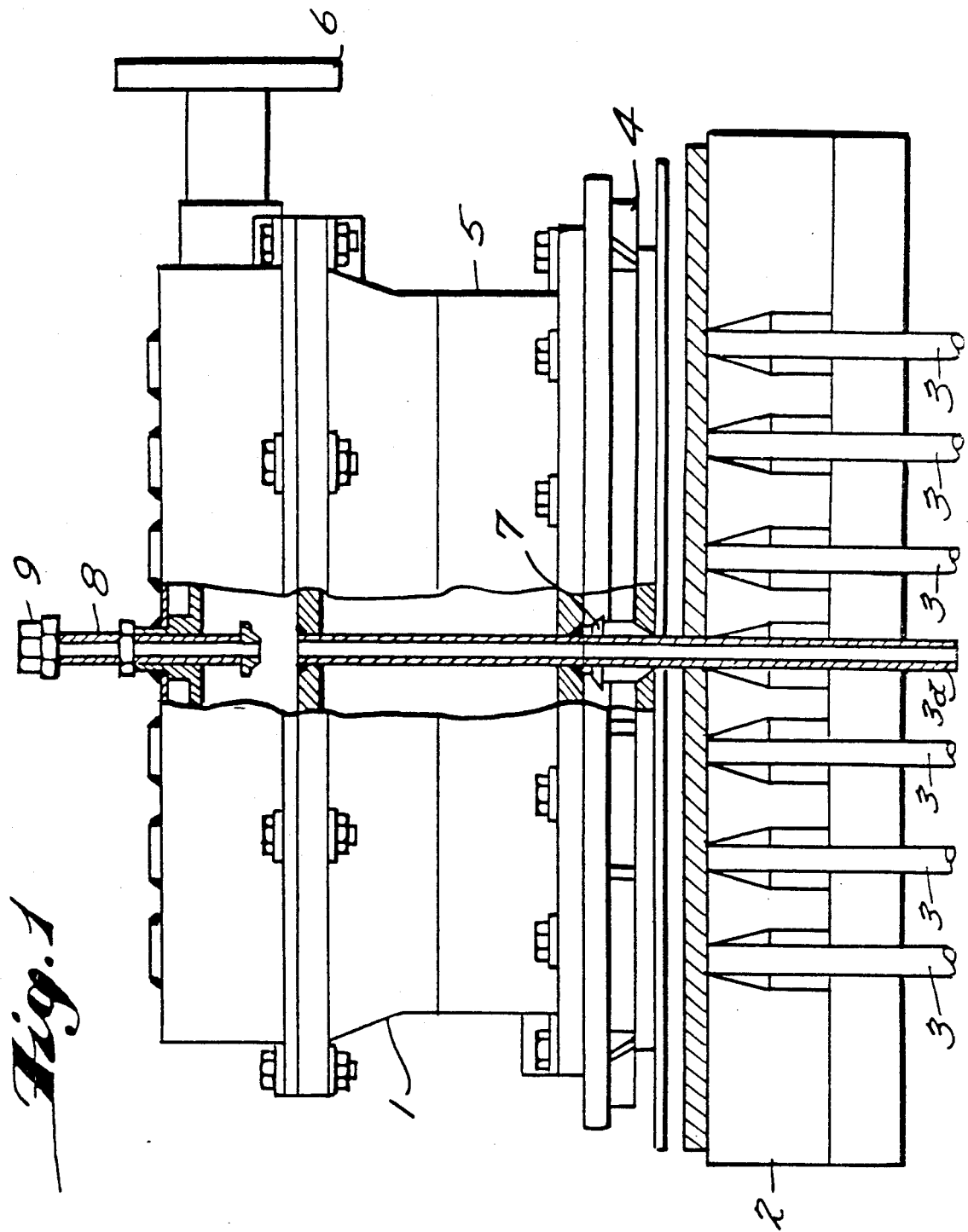
FIG. 1 shows a furnace according to the present state of the art.
Figure 2:
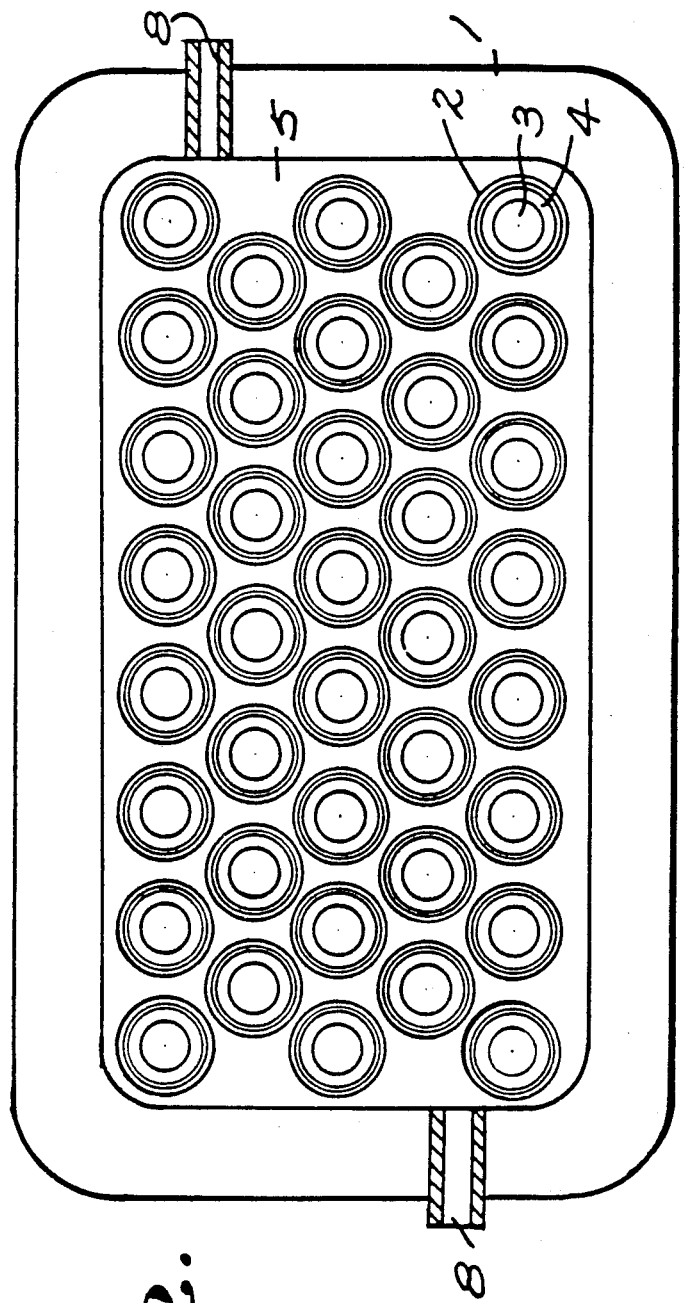
FIG. 2 shows the new construction of the lower part of the furnace top in plan view.
Figure 2A:
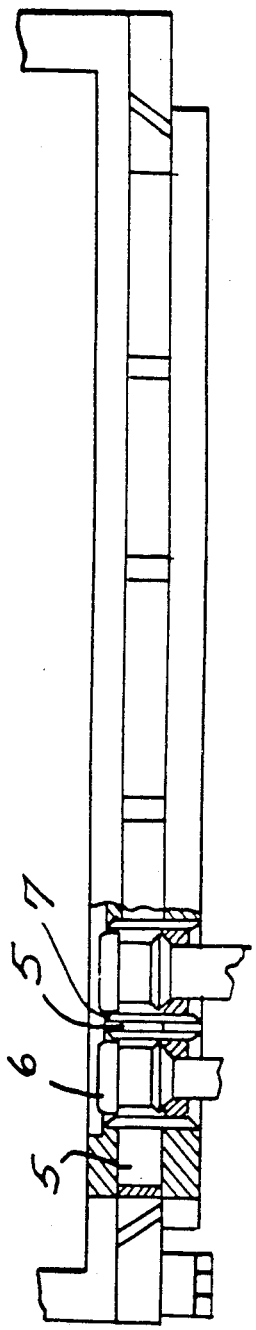
FIG. 2A is a side view of the new construction of the lower part of the furnace top.

The new construction of the furnace top-lower part is shown in FIG. 2 in plan view and in FIG. 2A in side elevation.

Number 1 indicates the lower part of the furnace top, number 7 the exchange tube of the short tubular heat exchanger, number 3 the reactor tube, and number 6 the stuffing box. The space for the cooling medium is shown by the number 5.

FIG. 2A shows the furnace top-lower part with the stuffing boxes 6 and their adjustment to each exchange tube 7. The cooling medium is located at number 5. The supply or withdrawal of the cooling medium is carried out laterally, for example, at 8.

As can be seen, there can be accommodated without problem thirty-eight reaction tubes in the furnace top-lower portion of the invention, see FIG. 2. Accordingly, what was looked at as the quasi natural limit of twenty-six tubes has been exceeded considerably.

Figure 3A:
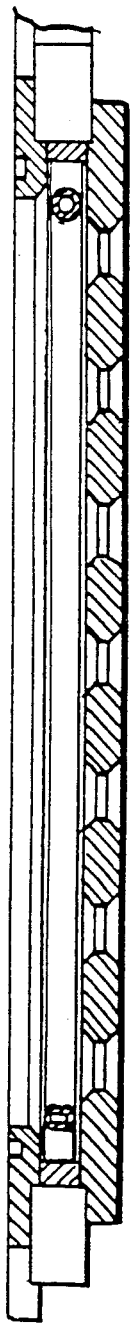
FIG. 3A is a side elevation of the stuffing boxes.
Figure 3:
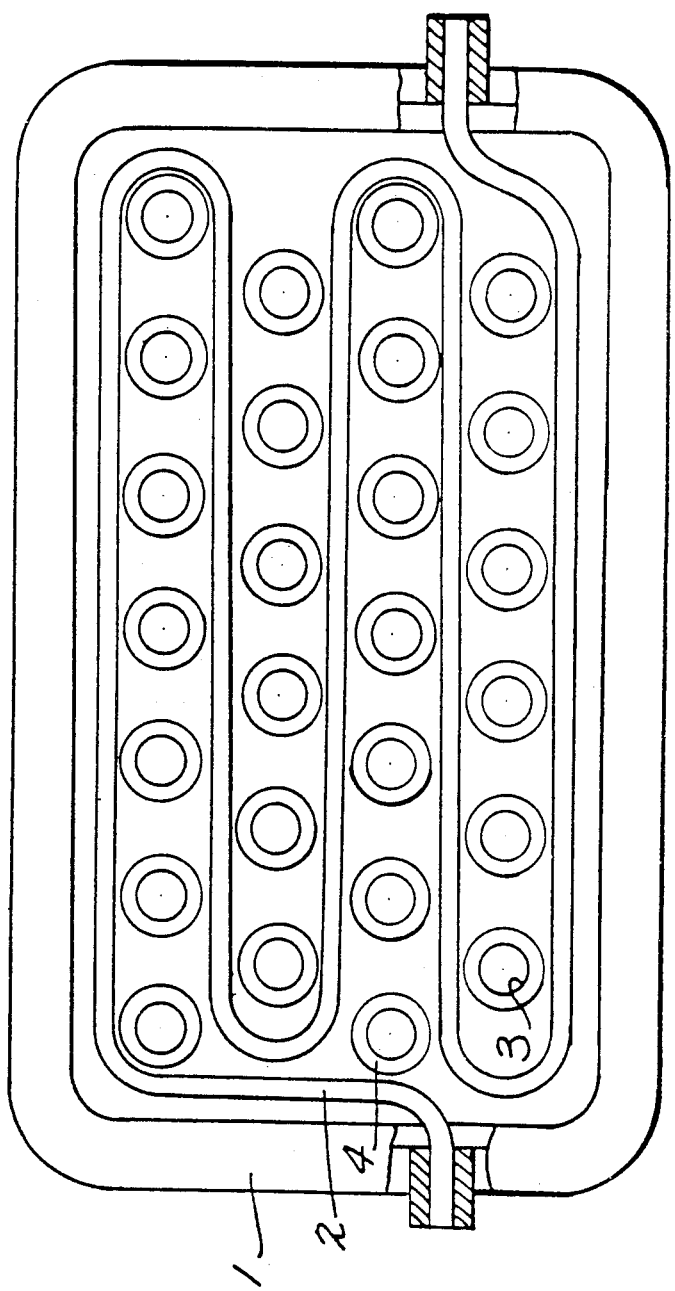
FIG. 3 is a plan view showing the filling of the stuffing boxes with the reaction tubes and the coil condenser.

The previous arrangement of the reaction tubes with a lower part constructed as a condenser coil is shown in FIGS. 3 and 3A. The numbers 1, 3, and 6 here also, as in FIG. 2, mean the lower part of the furnace top, the reaction tube, and the stuffing box. Number 12 indicates the coil condenser which takes care of the problem in this old arrangement, of cooling the stuffing boxes with the reaction tubes held therein in the lower part of the furnace top.

As can be readily seen from FIGS. 3 and 3A, the stuffing boxes containing the reaction tubes and the coil condenser completely fill the space available in the lower part of the furnace top.

As already stated, according to the previous construction of the furnace top-lower part, the maximum number of reaction tubes provided for was limited to twenty-six tubes per reactor unit (furnace chamber). These tubes were hung free in the chamber, according to FIG. 4.

Figure 5:
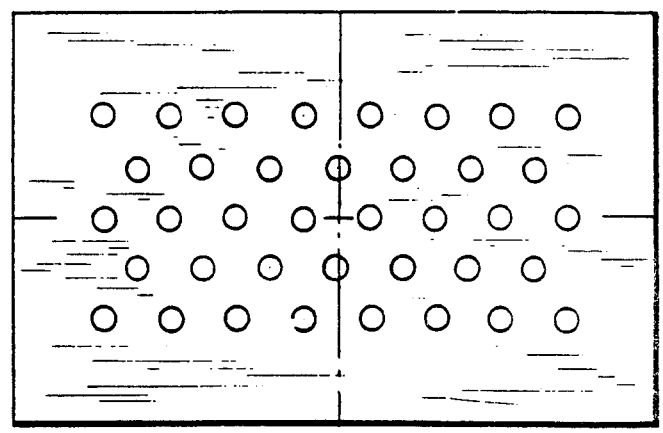
FIG. 5 shows the arrangement of tubes according to the new construction.
Figure 6:
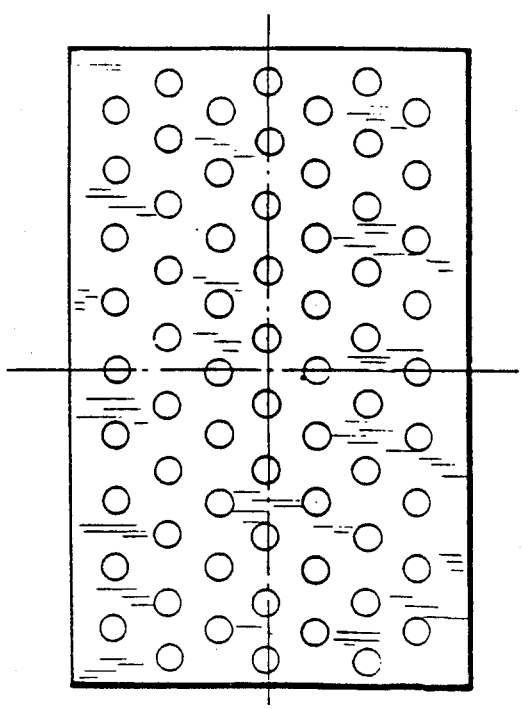
FIG. 6 shows the maximum number of tubes in the new construction.

FIG. 5 shows the tube arrangement which results through the new construction of the lower part, according to FIG. 2, for thirty-eight tubes per reactor unit, and FIG. 6 shows the now resulting geometrically maximum number of sixty-six tubes.

This substantial, not foreseeable, increase in the number of reaction tubes per reactor unit, however, only leads to a corresponding increase of the total throughput per reactor unit if the throughput per individual tube is maintained. For this, it is necessary that each individual tube is brought in as wide a zone as possible to the necessary temperature of over 1000° C. for the endothermic reaction. It is useless if through the increased number of tubes there is present a temperature profile for unfavorably positioned individual tubes in which there cannot be fulfilled the so-called BMA criteria, i.e., the shortest possible heating zone to reach about 1000° C. for the gaseous mixture employed and quick cooling after the reaction in the upper section of the reaction tube or the furnace top to below 300° C. Therefore, it is necessary to so formulate the number and positions of the burners to the arrangement of the reaction tubes that there is guaranteed a homogeneous temperature distribution.

The same requirements are also true for the use of tubes of different geometry and inner structure according to the invention.

From these requirements there results either symmetrical or asymmetrical arrangement which can be more or less strongly "relaxed" and which for example, are described in the following illustration of arrangements.

Figure 7:
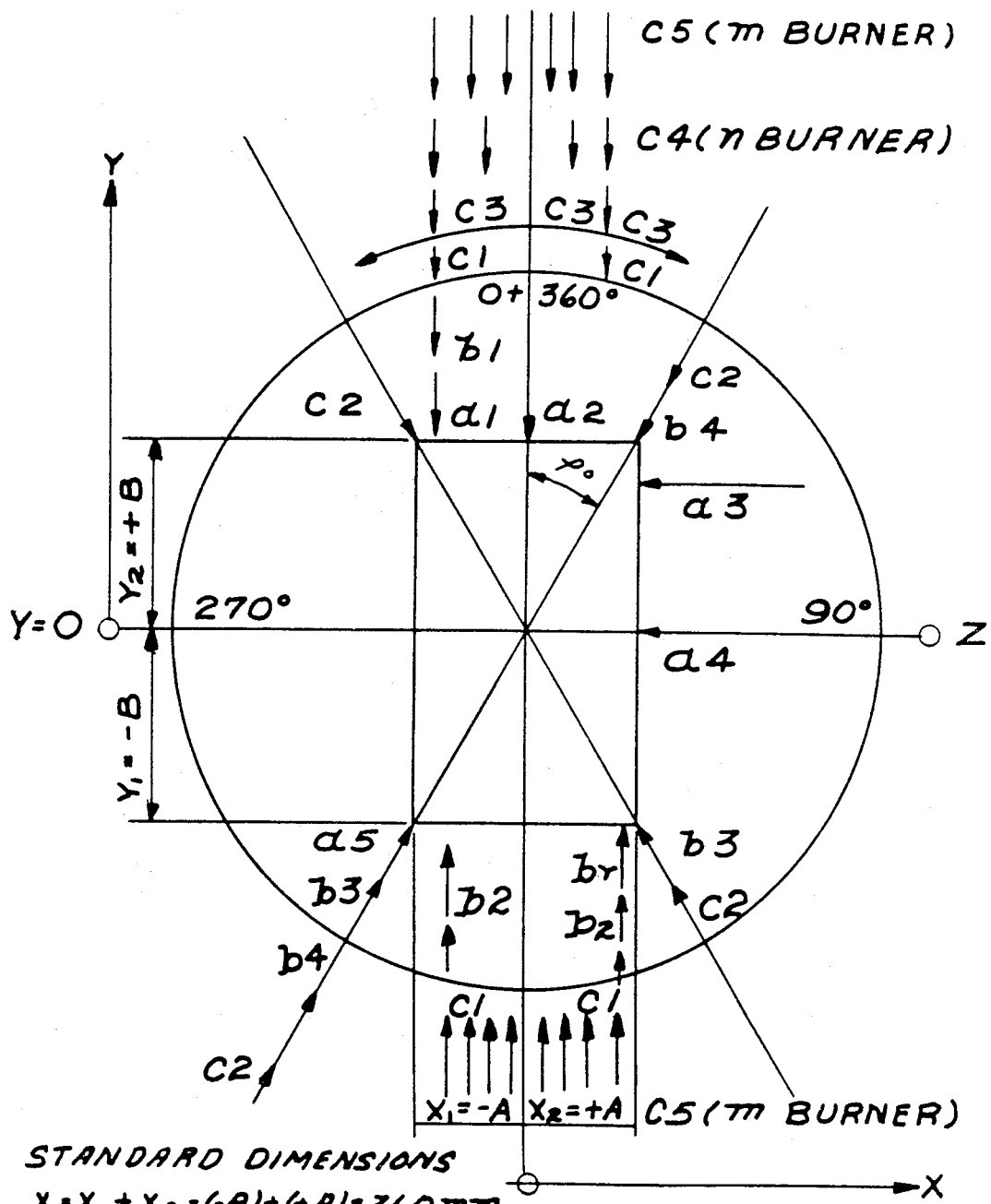
FIG. 7 shows a furnace chamber and various possible positions for the burner.

FIG. 7 shows a furnace chamber A and the various possible positions for the burner or burners. Thereby there are only located the X- and Y- coordinates; in a multi-burner arrangement these can be installed at different heights. Thereby in FIG. 7 and also in FIGS. 8–10 the letter "a" designates a single burner operation, the letter "b" a two burner operation, letter "c" a multi-burner operation (n), i.e. more than two.

The positioning of the tubes can be tuned to these burners corresponding to either of the already described arrangements in FIGS. 5 and 6. However, there are preferred arrangements as shown in FIGS. 11–23. Thus FIG. 11 shows the arrangement of the burner or burners with a substantially higher number of tubes, namely sixty-six tubes, than in the old system of arrangement and using a one burner operation or a two burner operation.

Figure 11:
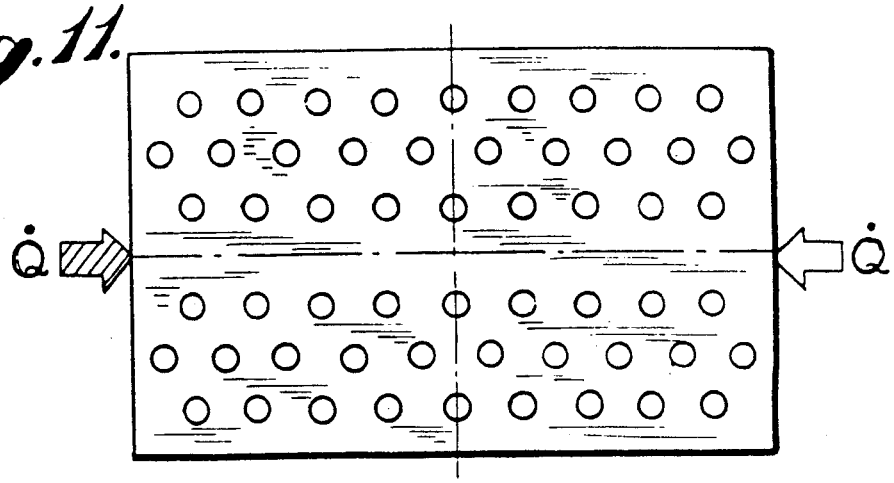
FIGS. 11–12 show various burner arrangements.

A single burner Q, see FIG. 11, can be arranged either on the left or the right narrow side of the furnace chamber. The position on the left side of the drawing is shown by a hatched arrow, the position on the right side by a plain arrow.

If two burners Q are present they are present on opposite narrow sides of the furnace chamber.

Through the artificially brought about channels between the two groups of tubes shown in FIG. 11, the heat supplied from the individual burner or the two burners is distributed homogeneously to the entire furnace chamber. Radiation heat predominates at the temperature region prevailing in the BMA process.

On the contrary, if the channels left free were occupied with tubes then the greatest portion of the heat would be shielded by the tubes. Through this necessarily there would occur clearly lower temperatures, e.g. in the tubes in the middle.

The same consideration lead, to the arrangement of tubes in FIGS. 12–20 in which the tubes collectively have the same geometry and the same inner surface structure.

Figure 12:
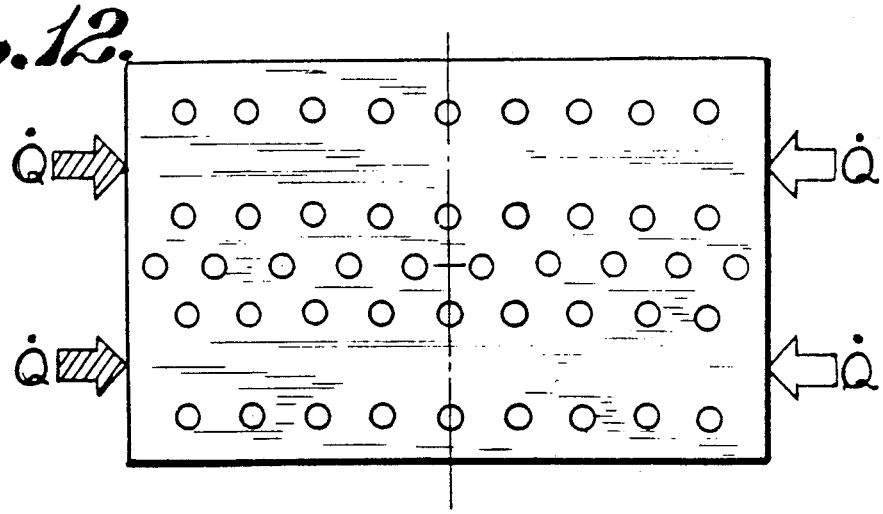
Figure 13:
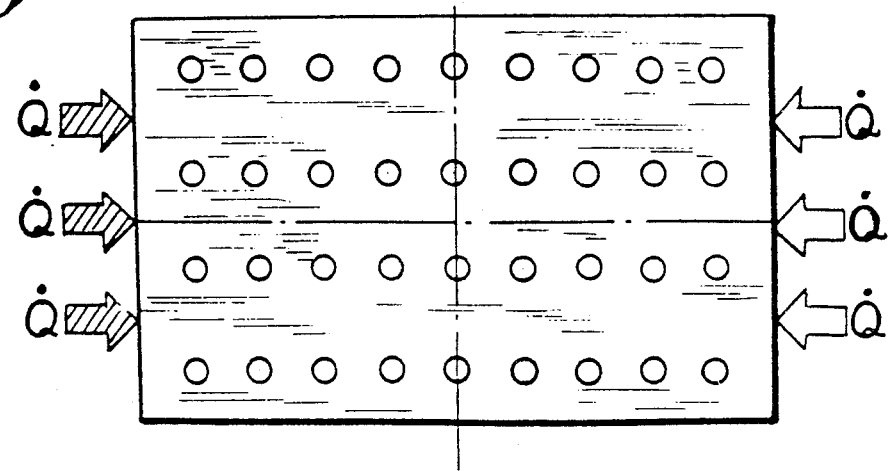
Figure 17:
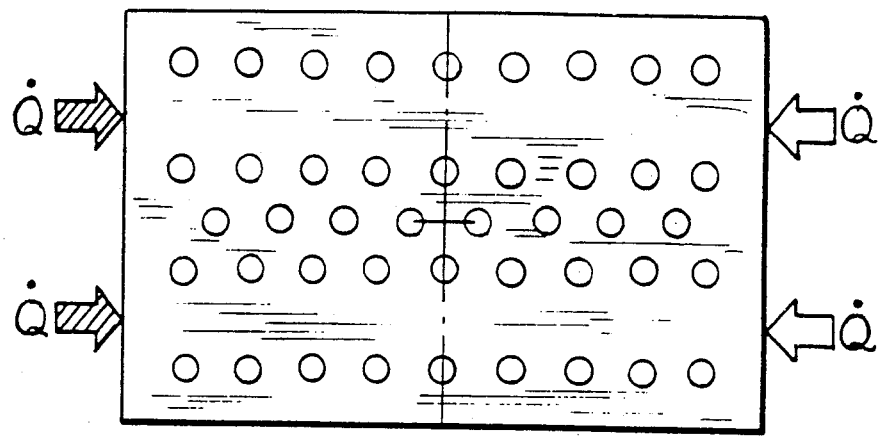
Figure 18:
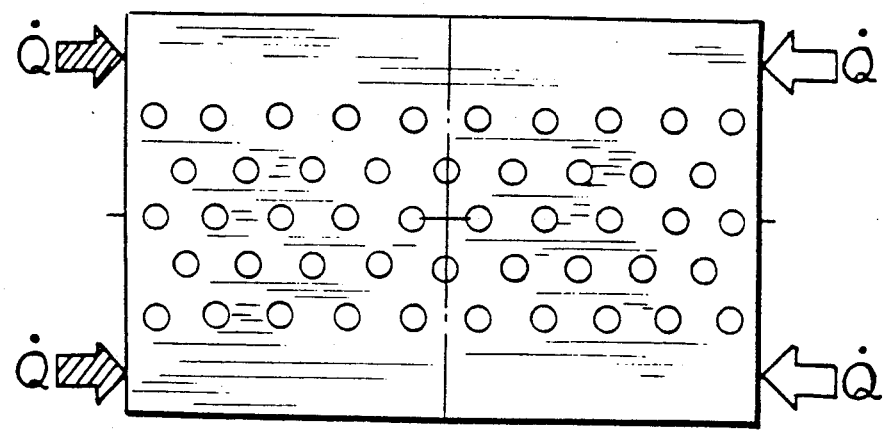
Figure 19:
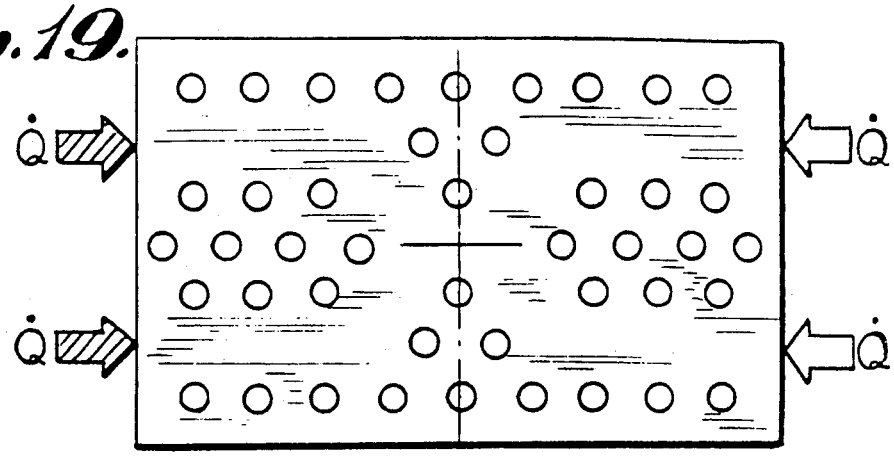
Figure 20:
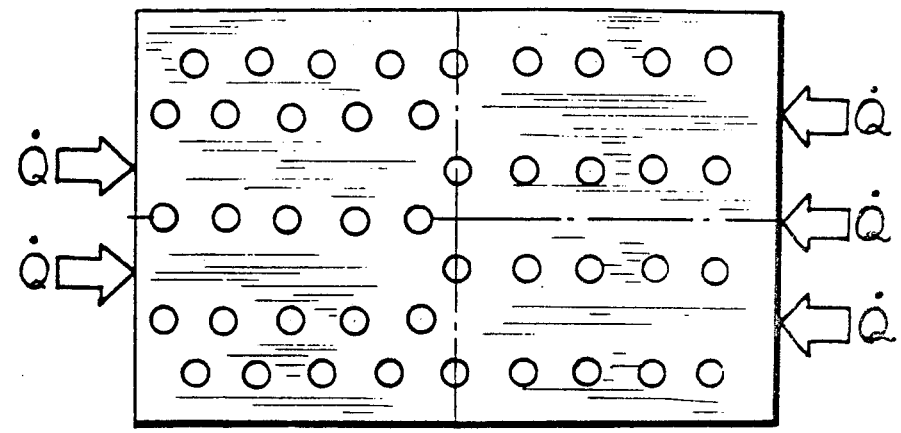

As is evident in these arrangements there are present different numbers of tubes and burners. Thus, e.g. FIG 12 shows a two or four burner operation, FIG. 13 a three or six burner operation, etc.

If there is to be avoided the pressuring of unfavorably positioned tubes with only a lesser amount of gas, it is possible as mentioned above, not only to use tubes of the same geometry and internal structure, but also to use those having a different geometry and internal surface structure. With the different geometries it is a matter of tubes having different diameters; with the different internal structures there is considered, for example, unlike normal tubes having smooth, inner walls, tubes which are artificially roughened either when they are produced or later, or which are provided with smooth or drilled inner flanges. Additionally there is the possibility of installing in the furnace chamber tubes of the same type but with different amounts of catalyst per individual tube and therewith, e.g. in cooler zones, to have an increased supply of catalyst.

Besides the artificially provided channels these different types of tubes offer the possibility of solving the problem of increasing the throughput per furnace chamber by a mixed arrangement of different tubes. If there are arranged in the necessarily colder areas of the arrangement of tubes in which the reaction tubes do not completely reach the necessary operating temperature tubes having larger internal diameter or with deviating inner structure, e.g. through a larger inner catalyst surface area or both, i.e. greater inner diameter and greater catalyst surface area, then the reaction also attains the customary value in these individual reaction tubes as well. With enlargement of the inner diameter there is increased the residence time of the reaction gases in the tube; with greater catalyst surface area or amount there is to be expected an increased reaction number.

Figure 21:
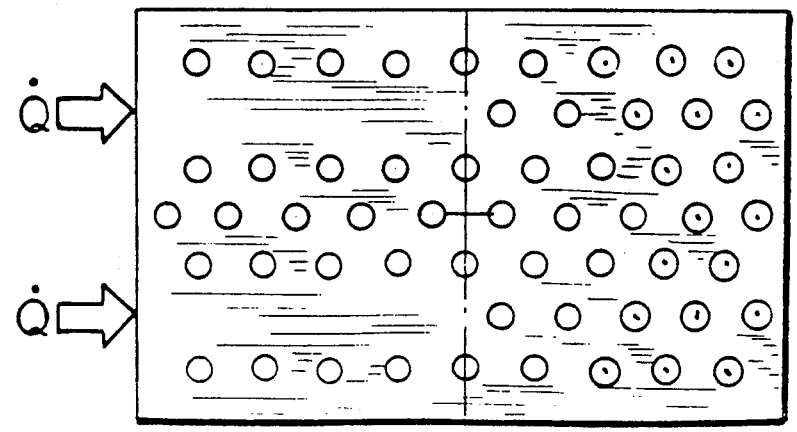

FIGS. 21–23 show arrangements for these types of reaction tubes for e.g., a one or two burner operation. The previously used tubes are clear while the tubes different from them which have a greater inner diameter and/or a different internal structure have a "dot".

Such internally modified tubes are available on the open market and can be coated with catalysts according to special methods, e.g. according to German Pat. No. 3,034,957, the entire disclosure of which is hereby incorporated by reference and relied upon. Without doing anything to them if they have a greater internal diameter they can be used in the new lower part of the furnace top according to the invention by correspondingly dimensioning the stuffing boxes.

The industrial advantage of the process and apparatus of the invention, namely the newly structured lower cooling part of the furnace top or the new type of pattern of the arrangement of tubes 2 of the same or different type of structure while maintaining the known, advantageous temperature profile of the BMA process through an optimum arrangement of the burners in a furnace chamber or both is in the unexpectedly drastic increase of the space-time-yield for a furnace chamber (reactor furnace unit).

The invention is explained in more detail in connection with the following examples.

DETAILED DESCRIPTION

Example 1

Figure 4:
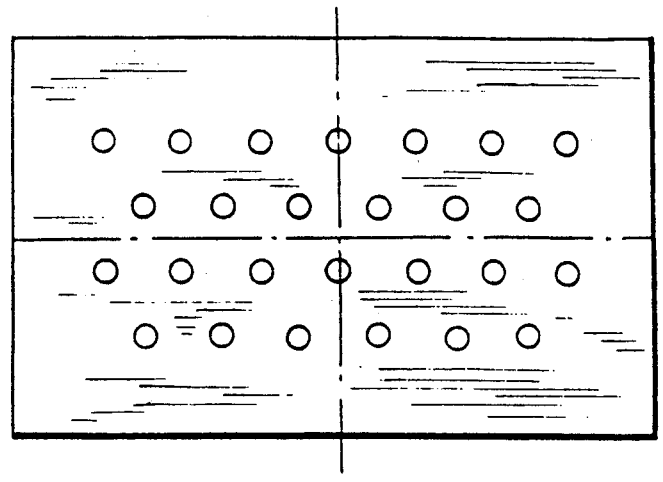
FIG. 4 shows the prior art arrangement of twenty-six tubes in the lower part of the furnace top.

There were reacted in a BMA furnace chamber equipped with twenty-six catalysts tubes which were coated internally with a platinum catalyst and which corresponds to the arrangement of the chamber in FIG. 4 methane and ammonia in a ratio of 1:1.05 at a temperature of 1350° C. at the catalyst to form hydrocyanic acid. The burner employed for heating the furnace chamber is located in position $a_1$ according to FIG. 8. The HCN yield was 70% based on the ammonia employed.

Example 2

Example 1 was repeated with the only difference that there were employed two burners in which both burners were in the positions $b_1$ according to FIG. 9. The yield at the same individual tube throughput as in Example 1 was 82.4% based on the ammonia employed.

Example 3

Under the conditions of Example 2 (two burner operation) but with catalyst tubes whose internal diameter is about 10% greater under conditions which otherwise were the same synthesis conditions and throughputs there were obtained yields of 83% based on the ammonia added.

Example 4

There were installed in furnace chamber of the same geometry thirty eight tubes according to the process of the invention and FIG. 5. The chamber was heated with a burner which was located in position $a_1$ (FIG. 8). The yield average over all thirty-eight tubes was 50%.

Example 5

Example 4 was repeated but using two burners according to FIG. 9 in position $b_1$. The yield at the same individual tube throughput, likewise the averaged over all thirty-eight tubes was 82%.

Example 6

Example 4 was repeated with sixty-six tubes in all as shown in FIG. 6. The burner arrangement correspond to Example 5.

At an unchanged throughput per individual tube, the yield averaged over all tubes was 45%.

Example 7

Example 6 was repeated but with the number of tubes reduced to sixty-five in a pattern according to FIG. 15. The yield averaged over all the tubes was 78%.

Example 8

Example 7 was repeated but the four middle tubes (see FIG. 15) were exchanged for four tubes which because of their internal structure, had an about 20% greater catalyst surface area. The yield averaged over all the tubes was 79.5%.

The entire disclosure of German priority application No. P 33 09394.6 is hereby incorporated by reference.

What is claimed is:

1. A tube furnace suitable for carrying out the BMA process at a temperature above 1000° C. comprising at least one furnace chamber having hanging ceramic reaction tubes therein, a common gas supply means in communication with said tubes, a common gas withdrawal means in communication with said tubes, at least one burner for heating said at least one furnace chamber, a cooling head through which gas is withdrawn from said ceramic tubes to said common gas withdrawal means, said cooling head having a lower part, said lower part having a cooling chamber, means for introducing cooling liquid into said cooling chamber, means for withdrawing liquid from said cooling chamber, a plurality of individual heat exchange tubes extending through said cooling chamber, the exterior of each of said heat exchange tubes being independently in contact with said cooling liquid, said heat exchange tubes corresponding in number to the number of ceramic tubes, a plurality of stuffing boxes, each containing a tubular flexible insulator positioned and arranged within a respective said individual heat exchange tube, one of said ceramic tubes being suspended within each of said flexible insulators, whereby each ceramic tube is in heat exchange communication with said cooling liquid, the height of said lower part corresponding to that of the individual heat exchange tubes, the stuffing boxes contacting the heat exchangers in such manner that the product gases flowing through the ceramic tubes experience a temperature drop in the lower part of said cooling head to a temperature below 300° C., whereby it is possible to maintain, in the warmer and colder zones formed by heating the furnace chamber, the necessary temperature profile for the customary throughout of reaction gases either (1) by tighter or less tight arrangement of the ceramic tubes, and/or (2) by employing ceramic tubes having different inner and/or outer diameters.

2. A tube furnace according to claim 1 wherein there are 66 ceramic reaction tubes.

* * * * *